Figure 1:
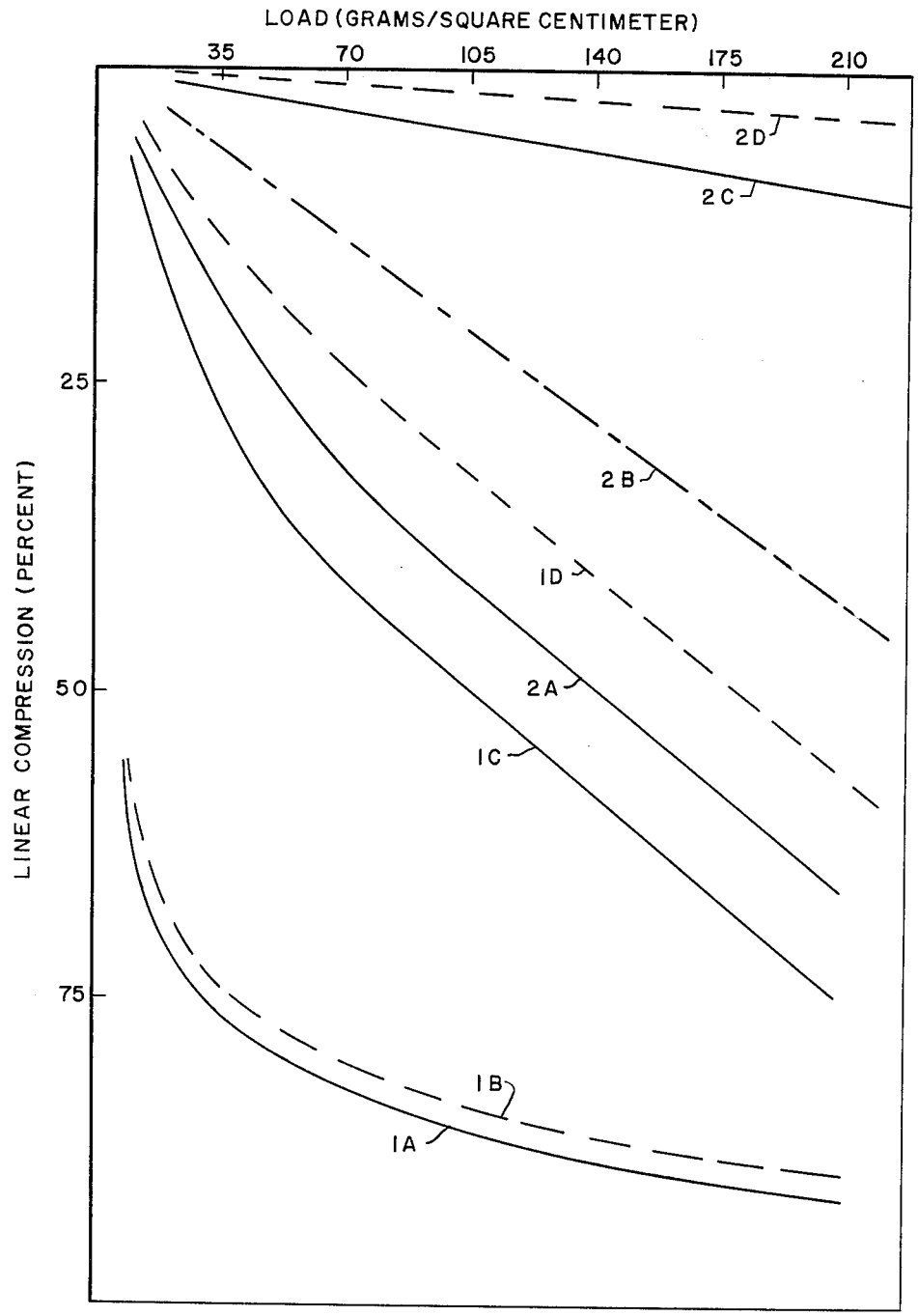

FIG. I

INVENTOR:
HENDRIK VAN OLPHEN

United States Patent Office 3,203,903
Patented Aug. 31, 1965

3,203,903
PROCESS FOR PREPARING PHYSICALLY
STRONG AEROGELS
Hendrik Van Olphen, Bellaire, Tex., assignor to Shell Oil
Company, New York, N.Y., a corporation of Delaware
Filed June 27, 1960, Ser. No. 39,124
5 Claims. (Cl. 252—317)

This invention relates to inorganic aerogels characterized by substantial physical stability, and to a process for preparing such aerogels.

It is well known that aerogels of inorganic materials, such as clays, metal oxides and the like, can be prepared by removing the dispersing medium (i.e., the liquid phase) of the corresponding gels and replacing that medium with a non-condensible gas under conditions such that no gas-liquid interface exists in the dispersing medium during that removal and replacement. As a practical matter, two general methods are used to effect removal of the dispersing medium and to replace it with a gas. In one, the gel is heated to a temperature above the critical temperature of the liquid dispersing medium, the pressure being sufficiently high to prevent conversion of the liquid in the gel to the gas phase until the gel is at or above the critical temperature of the liquid, thus converting the liquid to gas without formation of a gas-liquid interface within the gel, then gradually removing the gas phase until all of the dispersing medium of the gel has been removed, replacing the removed gas with a non-condensible gas such as air. In the other, the gel is frozen, then is subjected to such a reduced pressure that the originally liquid, now solid, dispersing medium is removed by sublimation without formation of a gas-liquid interface. The term "aerogel" as used herein has its usual meaning. The nature of such aerogels is set out in some detail in, for example, the patent to Kistler, U.S. 2,093,454, and in the article by Kistler, 36 Journal of Physical Chemistry, 52 (1932).

While such methods have been used to prepare aerogels of a variety of inorganic aerogels, it has been found that many of those aerogels, particularly those of the clays, and other materials which readily form plastic suspensions with liquids but do not readily form true gels, have little or no physical strength, but readily reduce to a fine powder.

Aerogels of inorganic materials are potentially valuable for a variety of applications, including use as catalysts, catalyst supports, insulation, as the stationary phase, or solid support, in chromatographic separations, as gas diffusion membranes, as porous adsorbents for gases, and the like. However, to be useful in many of these applications, it is necessary that the aerogel be in a stable shaped form, such as a pellet, or a sheet, which has sufficient physical strength to resist physical forces tending to cause it to break up. Since many of the aerogels prepared according to the methods known heretofore do not have any substantial physical strength, it has not been possible to exploit fully the potential usefulness of those aerogels.

A method for preparing physically stable, mechanically strong aerogels of inorganic materials has now been found. This method comprises forming a gel of the inorganic material in which there is uniformly and intimately admixed a polymeric material which has substantial solubility in the liquid which composes the dispersing medium of the gel, then removing the dispersing medium and replacing it with a non-condensible gas phase, under conditions such that no gas-liquid interface exists in the dispersing medium during its removal. The aerogels of inorganic materials prepared in this way have been found to have substantially greater mechanical strength than the aerogels of the same inorganic materials prepared by the methods known before this invention. It has been found, for example, that clay aerogels, which have little physical strength when prepared according to the prior art methods, when prepared according to the process of this invention can readily be formed into different shapes and are physically strong enough to retain those shapes when subjected to physical stresses encountered during their use. This invention thus provides inorganic aerogels of improved physical strength.

From the experimental work which has been done in the development of this new process, it appears that the process is applicable to the preparation of improved aerogels of any of the inorganic materials which are known to form aerogels. The process of this invention accordingly is applicable to the preparation of improved aerogels of such inorganic materials as silica, metal oxides, including alumina, clays, metal salts, and the like. The new process is particularly of value for the preparation of aerogels of clays, and other materials which readily form plastic suspensions in water but which do not readily form true gels with water, since prior art processes have not been capable of producing aerogels of these materials which have sufficient strength to permit their use for many applications, whereas the aerogels of clays and like materials produced by the new process have physical strength adequate to permit their use for those applications.

By the term "clay" is meant any of the materials composed of one or more minerals and accessory compounds, the whole usually being rich in hydrated silicates of aluminum, iron, or magnesium, hydrated alumina or iron oxide, predominating in particles of colloidal or near-colloidal size and forming plastic suspensions in water. (Kirk-Othmer, Encyclopedia of Chemical Technology, volume 4, pages 26 and 27, Interscience Encyclopedia, 1949.) Included are the kaolin minerals, kaolinite, dickite, nacrite, anauxite, and halloysite-endellite; the montmorillonite minerals—i.e., the bentonite clays—montmorillonite, beidellite, nontronite, hectorite, saponite, sauconite; the illite-bravaisite-hydromica minerals—attapulgite, sepiolite, allophane.

The suitable polymeric materials are those which have a substantial solubility in the dispersing medium of the gel to be used in the preparation of the aerogel. The polymeric material used suitably can be a naturally occurring material, a naturally occurring material which has been modified, as by physical and/or chemical treatment, or a synthetic material.

Since water is the most common dispersing medium ordinarily used in the preparation of gels and has properties which permit its ready removal to form aerogels, in most cases water will be the dispersing medium used and the polymeric material must be one which has substantial solubility in water. The expression "water-soluble" is intended to include materials which form true solutes in water, as well as those which swell and become dispersed in aqueous media. The polymeric material may be either an electrolyte or a non-electrolyte.

The suitable polyelectrolytes are the polymeric materials having more than one acidic grouping per molecule. By acidic grouping is meant not only the acid moieties such as the sulfonic acid group, the carboxyl group, the various phosphorus acid groups, phenol groups and the like, but also their salts with both monovalent and polyvalent metals, with ammonia, and with such other salt-forming groups as the various phosphonium and sulfonium groups, and also their esters. The suitable polyelectrolytes include those wherein all of the acidic groups are combined as salts and those wherein but a part of the acidic groups are combined as salts. The suitable polyelectrolytes of this type can be generically described as water-soluble organic polymeric polyelectrolytes having a molecular weight of at least 10,000. Several classes of this genus of polyelectrolytes are well known. One class is that in which the polyelectrolyte is thermoplastic—that is, the class of polyelectrolytes which are substantially free from cross-linking, or potentially cross-linking, structures. The two best-known subclasses of this class are the polymeric materials wherein the essential structure is a chain of carbon atoms, acidic groupings being substituted to that chain, and those wherein the essential structure is a chain of rings, as in cellulose derivatives wherein the ring structures are cellobiose structures. Another class of this genus is that which is known as the corpuscular proteins, the chief subclass being the albumins.

Examples of this subclass wherein the essential structure of the polymer is a chain of carbon atoms are the copolymers of maleic anhydride, maleic acid, salts of maleic acid, and maleic amides with any copolymerizable monoolefinic monomer, such as vinyl acetate, vinyl alkyl ethers, vinyl chloride, and isobutylene, particularly the alkali metal, ammonium and alkaline earth metal salts of said copolymers. Such polymers are described in detail in United States Patent No. 2,652,323. Other suitable polymers are the water-soluble sulfonated polystyrenes, polymers of acrylic acid, methacrylic acid and derivatives thereof, such as alkali metal salts, alkaline earth metals and ammonium salts thereof, and the copolymers of these acids and their derivatives with other monoolefinic monomers copolymerizable therewith. Typical examples of this type are polyacrylic acid, its partial and full salts, and the full and partial salts of hydrolyzed polyacrylonitrile. Such polymers are described in detail in United States Patent No. 2,625,529. Other suitable polymeric materials are the sulfur trioxide-acrylic acid-vinyl alkyl ether polymers of United States Patent No. 2,778,812 and the urea-methacrylic acid polymers of United States Patent No. 2,774,659.

Examples of the subclass exemplified by the cellulose derivatives include such materials as the carboxyalkyl celluloses, particularly carboxymethyl cellulose, carboxyalkyl dextrans, such as carboxymethyl dextran (United States Patent No. 2,780,888), polysaccharide xanthates (United States Patent No. 2,761,247), arabic acid, alginic acid, pectic acid, oxidized starch, mucin, hyaluronic acid, polyglucuronic acid, and acids derived from naturally occurring gums such as tragacanth, locust bean, quince seed, linseed, karaya and acacia, agar, carageen, and the like.

Typical examples of the suitable proteins include gelatins, albumins, and the like.

The suitable non-electrolytes include such polymeric materials as the starches, dextrins, pectins, the naturally occurring gums already mentioned, polyvinyl alcohols and related polymers, such as hydrolyzed copolymers of vinyl acetate and styrene, butadiene, isoprene and propylene, and the like, polyoxyalkylene oxide condensates with various hydroxy-containing polymers, such as the polyoxyalkylene oxide condensate of hexitan anhydride, and the like.

Described in more detail, the process of the invention comprises forming a gel of an inorganic material, there being uniformly and intimately dispersed throughout said gel a polymeric material as hereindefined, then removing the liquid dispersing medium of the gel by either heating the gel to a temperature above the critical temperature of said liquid maintaining the pressure at or above the critical pressure of said liquid to prevent conversion of said liquid to gas, then when the temperature of the gel is above said critical temperature, removing the then gaseous dispersion medium of the gel and replacing it with a non-condensible gas, or freezing said gel, then reducing the pressure to effect removal of the then solid dispersing medium by sublimation.

Formation of the gel of the inorganic material is accomplished by the usual well-known means, which are described in chapter 19, Weiser, A Textbook of Colloid Chemistry, 2nd edition, Wiley, 1949. In general, gels of metal oxides, hydroxides, salts, and the like are prepared by the rapid precipitation of the inorganic material from a solution or suspension. Clay gels and suspensions can often be prepared by intimate mixing—as for example, in a colloid mill—of the clay with the liquid, which in the great majority of cases is water. In the cases of some clays, a plastic suspension of the clay is obtained by merely adding water to the dry clay. In some cases, a gel of a solid with a particular liquid is best formed by first forming a gel of that solid with a different liquid (one with which it forms a gel readily) then replacing the liquid in the gel with that which is desired.

The polymeric material likewise can be introduced into the gel in a variety of ways. Thus, the polymeric material can be first dissolved in the liquid to be used in forming the gel, then the gel formed. Or the gel can be formed, then contacted with a solution of the polymeric material in that liquid, or in a different liquid. This latter technique is particularly useful where the polymeric material is not soluble in the liquid used to form the gel, but is soluble in a different liquid, this latter liquid being used to introduce the polymeric material into the gel. This liquid-liquid replacement technique also can be used with more than two liquids—such extension of the technique is usually required where the liquid to be introduced into the gel is wholly incompatible with the liquid in the gel; in some cases, mutual solvents, consolute solvent techniques and the like are used to introduce the desired liquid. Further, the polymeric material can be introduced into the gel by straightforward mixing and/or blending procedures.

When the polymeric material is one which is soluble in the liquid which is to be used in preparing the gel, the preferred procedure is to include the polymeric material in the liquid at the time the gel is formed.

The procedures by which the liquid dispersing medium in the gel is removed and replaced by a gas to form the aerogel are essentially those set out in the prior art. The procedure involving removal of the dispersing medium at a temperature above the critical temperature of the liquid is commonly known as the Kistler procedure and is described in United States Patents Nos. 2,093,454, 2,188,007, and 2,249,767. Briefly, that procedure involves heating the gel in an autoclave, the pressure being allowed to increase to or above the critical pressure of the liquid in the gel, the heating being continued with the pressure being maintained at that pressure until the temperature is at or above the critical temperature of the liquid, then the dispersing medium of the gel, as a gas, is allowed to escape. After all of the dispersing medium of the gel has been removed, the resulting aerogel is allowed to cool.

The alternate procedure is to freeze the gel, in a closed container, then reduce the pressure in the container to permit the dispersing medium to sublime from the gel. This procedure is commonly known as freeze-drying.

The latter procedure is preferred because of its simplicity and the ease with which it is performed. In the great majority of cases, water will be the liquid used to form the gel. Because the critical temperature and pressure of water are so high, it is usually inconvenient to apply the Kistler procedure to a hydrogel. Accordingly, the hydrogel normally is treated with a liquid—usually a lower alcohol—having a lower critical temperature and pressure. This added step is not needed when the freeze-drying technique is used, since water is readily removed by sublimation of ice.

The amount of the polymeric material incorporated into the gel can vary greatly. As little as about 0.5% by weight of the polymeric material, based on the weight of the gel, can cause market change in the properties of the resulting aerogel. As a general matter, however, it is preferred to use an amount of polymeric material which is at least about 1% of the weight of the gel, to obtain optimum strength in the resulting aerogel. In terms of the inorganic material, as little as one-quarter part by weight of the polymeric material per part by weight of inorganic material effectively increases the strength of the aerogel, while preferably at least 0.4 part by weight of the polymeric material per part by weight of the inorganic material is used to obtain optimum strength in the aerogel. The maximum amount of the polymeric material which is used will depend upon the desired use of the aerogel, for it has been found that most if not all of the polymeric materials can be formed into physically strong aerogels by the procedures described in this invention. Where a relatively expensive metal oxide or salt is to be used as a catalyst, it may be desirable to form an aerogel primarily of the polymeric material with a minor amount of the metal oxide or salt present. In such cases as many as 99 parts by weight of the polymeric material can be used per part by weight of the inorganic material—or as necessary to obtain the necessary amount of catalytic inorganic material. In other cases, as for example in the cases of the clays, where the adsorption properties of the aerogel are important, it may be desirable to use only sufficient of the polymeric material to impart the necessary strength to the aerogel.

It will be appreciated from the foregoing description of the invention that the invention lends itself readily to the provision of aerogels having particular, desired properties. Thus, by proper selection of polymeric material and inorganic material, any desired combination of the properties of the two materials can be obtained. For example, a combination of a polymeric material which is a cadmium salt and a cadmium clay as the inorganic material will be useful as a slow-neutron absorbent. As another example, the clay, and even the polymeric material, can be salts or complexes with other materials which have particular adsorbent properties. The inorganic material may be a catalyst, the polymeric material being only inert carrier, or the polymeric material may be one which enhances or modifies the catalytic activity of the inorganic catalyst—as by appropriate selection of a cation in the polymeric material. Further, the strength of these improved aerogels permits their ready fabrication into stable shapes, and also permits their disintegration into highly porous, highly adsorbent powders, or their compaction into highly porous paper-like materials, as may be desired for a particular application.

The improved aerogels provided by this invention are, generically speaking, aerogels of intimate uniform admixtures of the inorganic material and the organic polymeric material. It is understood that the inorganic material is adsorbed substantially uniformly on the polymeric material structure and the aerogels may be considered to be co-gels of the two materials. The bulk density of these new aerogels will vary according to the particular inorganic material and particular polymeric material chosen. In the particular instance of clays as the inorganic material and sodium carboxymethylcellulose as the polymeric material, the bulk density of the resulting aerogels will vary from about 0.01 (the bulk density of the aerogel of the polyelectrolyte alone) to about 0.6 or higher, depending on the solids content of the original gel.

Application of the process of the invention in particular instances and demonstration of the improved properties of the particular aerogels prepared thereby are provided by the following examples, which are included herein for the purpose of illustration only.

*Example I*

Figure 3:
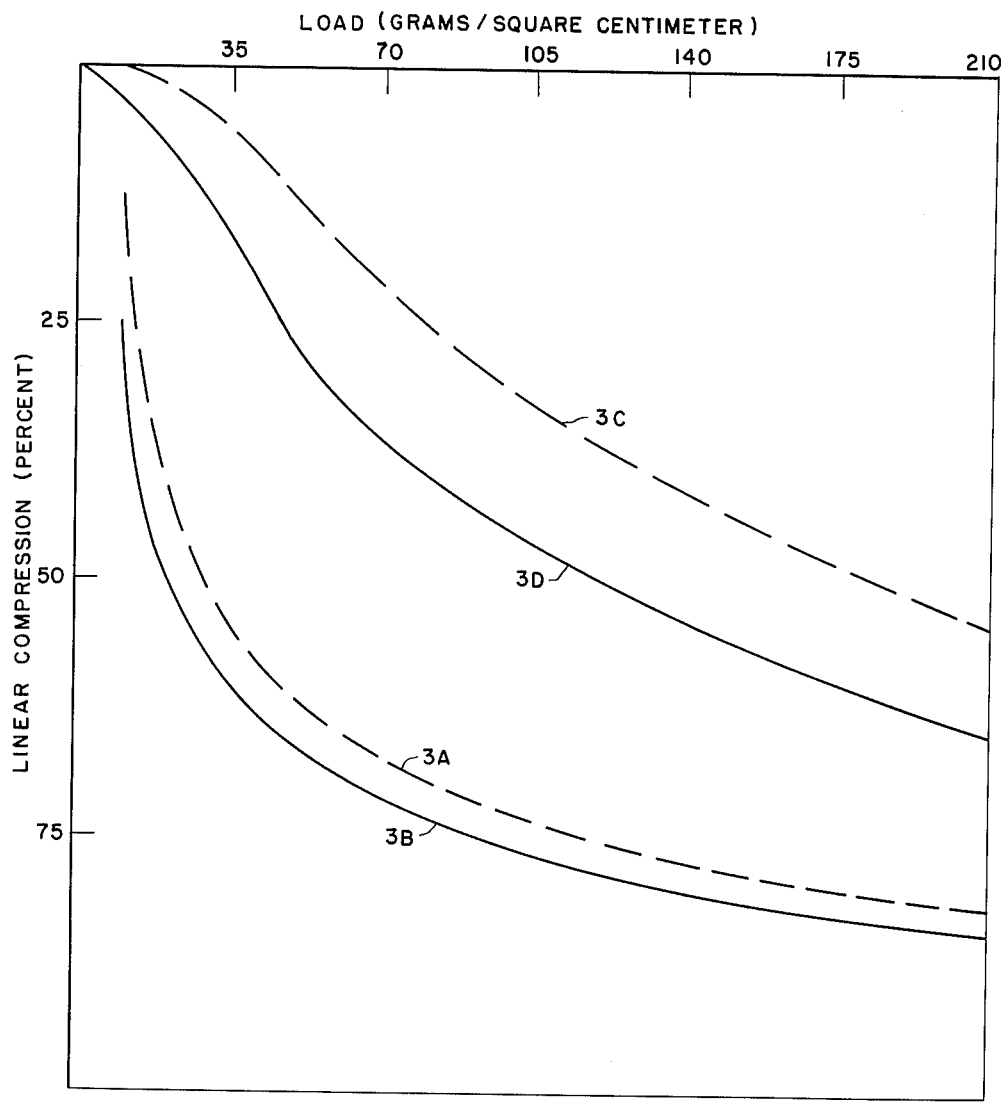

Suspensions and gels of Wyoming bentonite were freeze-dried in the form of cylinders 1.9 centimeters in diameter. The percent linear compression of such cylinders of 3–4 centimeters length was measured at different loads. At each load, the elastic recovery was determined. The same experiments were repeated, employing suspensions and gels of Wyoming bentonite containing carboxymethylcellulose, sodium salt. The results of the strength tests are shown in FIGURES 1 and 3. In FIGURE 1, the solid lines show the percent linear compression of the cylinders under load, while the dashed lines show the permanent percent linear change after removal of the load.

In FIGURE 1, line 1A shows the linear compression under load of the aerogel prepared from a one percent by weight suspension of the bentonite in water, while line 1B shows the linear compression of the same aerogel remaining after removal of the load.

Line 1C shows the linear compression under load of the aerogel prepared from a one percent by weight suspension of the bentonite and two percent by weight solution of the sodium carboxymethylcellulose in water, while line 1D shows the linear compression of the same aerogel remaining after removal of the load.

Line 2A shows the linear compression under load of the aerogel prepared from a five percent by weight suspension of the bentonite in the water, while line 2B shows the linear compression of the same aerogel remaining after removal of the load.

Line 2C shows the linear compression under load of the aerogel prepared from a five percent by weight suspension of the bentonite and a two percent by weight solution of the sodium carboxymethylcellulose in water, while 2D shows the linear compression of the same aerogel remaining after removal of the load.

In FIGURE 3, line 3A shows the linear compression under load of an aerogel prepared from a two percent by weight suspension of the bentonite in water, while line 3B shows the linear compression of the same aerogel remaining after removal of the load.

Line 3C shows the linear compression under load of the aerogel prepared from a two percent by weight suspension of the bentonite and 1.7 percent by weight of corn starch in water, while line 3D shows the linear compression of the same aerogel remaining after removal of the load.

It will be noted that in all cases the aerogel containing the polymeric material (sodium carboxymethylcellulose, starch) is much stronger than the corresponding aerogel containing no polymeric material.

*Example II*

Figure 2:
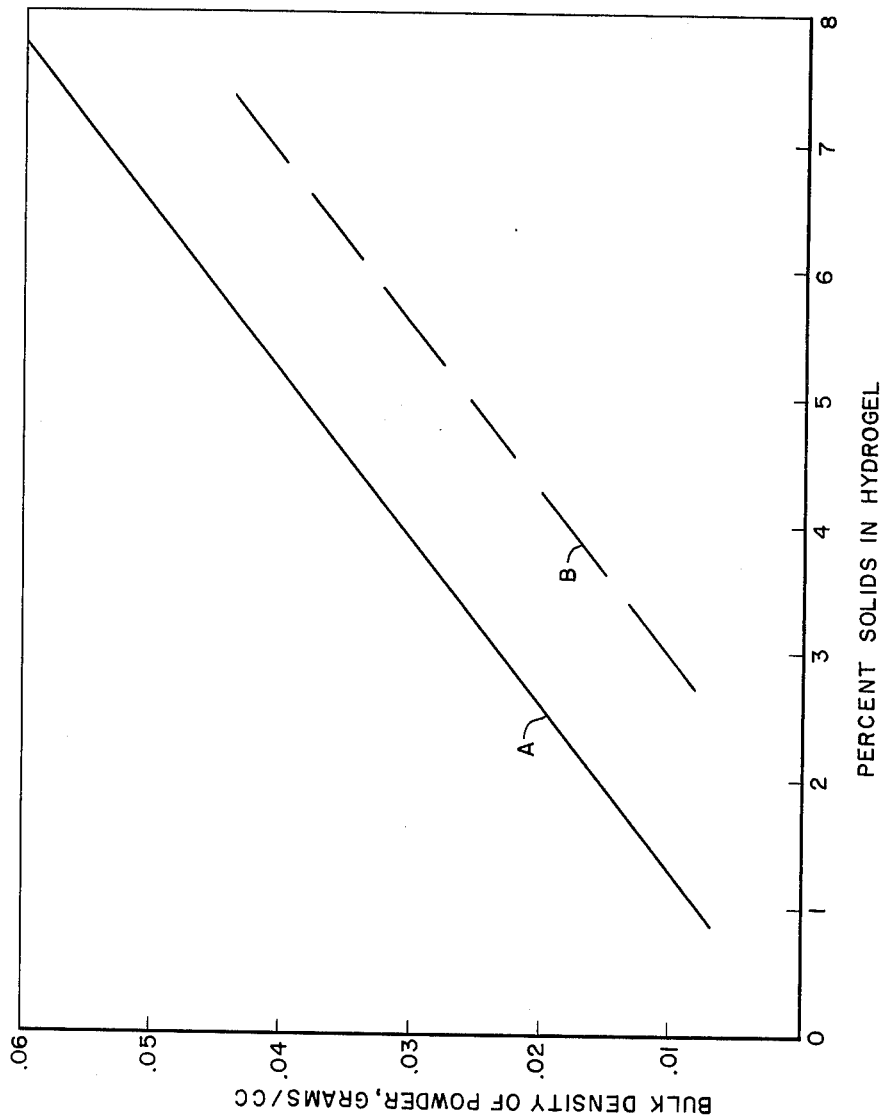

Suspensions of Wyoming bentonite were freeze-dried in thick layers—i.e., layers 2–3 millimeters thick. The aerogels were powdered in a standard manner in a mechanical blender. The bulk densities of the resulting powders were measured. The same experiments were repeated, employing suspensions of the bentonite containing sodium carboxymethylcellulose. The results are presented in FIGURE 2. Line A of FIGURE 2 represents the data for the bentonite aerogels while line B represents the data for the bentonite-sodium carboxymethylcellulose aerogels These data show that a relatively smaller bulk density is obtained when the sodium carboxymethylcellulose is present than when it is not, at the same total solids concentrations in the gel. The lower bulk densities of the bentonite-sodium carboxymethylcellulose aerogels are attributed to a better preservation of the aerogel structure during the powdering operation.

*Example III*

A suspension of 20 grams of Wyoming bentonite in water containing 0.3 gram of sodium carboxymethylcellulose was treated with pyridine hydrochloride. The resulting flocculated mass of the pyridine-bentonite clay complex was freeze-dried and powdered. This powder was found to be suitable for use in a gas chromatography column, in which it was used to separate hydrocarbons of similar boiling points.

In a powder prepared in a like manner from clay and pyridine hydrochloride only, the floc volume of the pyridine-bentonite complex was much smaller and the freeze-dried aerogel powder was less bulky and was found to be unsuitable for use in gas chromatography.

*Example IV*

A paste of 30% by weight kaolinite in water was freeze-dried in the form of a cylinder of 1.9 centimeters diameter. The cylinder of aerogel powders at the slightest touch. A paste of 30% kaolinite and 2% sodium carboxymethylcellulose prepared in the same manner gave a hard chalk-like rigid cylinder.

*Example V*

A paste of 23% Fithian illite in water was freeze-dried in the form of a cylinder 1.9 centimeters in diameter. The cylinder of aerogel disintegrates to a powder at the slightest touch. A paste of 23% illite and 2% sodium carboxymethylcellulose prepared in the same manner yields a coherent cylinder. This cylinder is compressed about 10% at a load of 1225 grams per square centimeter.

After powdering by the method indicated in Example III, the aerogel containing the sodium carboxymethylcellulose had a bulk density of 0.34 gram per cubic centimeter, whereas the aerogel containing none of the polymeric material had a bulk density of 0.48 gram per cubic centimeter—the aerogel containing no electrolyte was some 40% more dense than that containing the electrolyte.

I claim as my invention:

1. A process for preparing physically stable, mechanically strong aerogel of colloidal clay comprising forming an aqueous gel of such colloidal clay uniformly admixed with an organic polymeric material having substantial solubility in the aqueous dispersion medium and subsequently replacing said aqueous dispersing medium with a gas under conditions which avoid substantial shrinkage of said gel and which produce a hard, chalk-like rigid aerogel.

2. A process according to claim 1 in which the gas is air.

3. A process for preparing physically stable, mechanically strong aerogels of colloidal clay comprising forming an aqueous gel of such colloidal clay uniformally admixed with an organic polymeric material having substantial solubility in the aqueous dispersing medium and subsequently replacing said aqueous dispersing medium with a gas by freezing aqueous gel and subjecting it to reduced pressures so that said aqueous dispersing medium is replaced by a gas without the formation of a gas-liquid interface by sublimation.

4. A process according to claim 3 in which the organic polymeric material is alkali metal salt of carboxy methyl cellulose.

5. A process according to claim 4 in which the organic polymeric material is present in an amount of at least 0.4 part by weight based upon the weight of the colloidal clay.

References Cited by the Examiner

UNITED STATES PATENTS

| | | | |
|---|---|---|---|
| 2,166,868 | 7/39 | Jones | 252—430 XR |
| 2,409,494 | 10/46 | Keating | 252—430 |
| 2,428,608 | 10/47 | Bass | 252—317 XR |
| 2,520,805 | 8/50 | Joy | 106—193 XR |
| 2,933,455 | 4/60 | Doying | 252—428 |

JULIUS GREENWALD, *Primary Examiner.*

ALBERT T. MEYERS, *Examiner.*